(12) United States Patent
Nakamura et al.

(10) Patent No.: US 10,799,983 B2
(45) Date of Patent: Oct. 13, 2020

(54) LASER WELDING DEVICE (71) Applicant: TOYOTA JIDOSHA KABUSHIKI KAISHA, Toyota-shi, Aichi-ken (JP)

(72) Inventors: Ko Nakamura, Nagoya (JP); Junichiro Makino, Nagakute (JP); Takehiro Yamamoto, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 15/989,936

(22) Filed: May 25, 2018

(65) Prior Publication Data
US 2018/0345406 A1  Dec. 6, 2018

(30) Foreign Application Priority Data

Jun. 1, 2017  (JP) .................................. 2017-109377

(51) Int. Cl.
*B23K 26/14* (2014.01)
*B23K 26/21* (2014.01)
*B23K 26/36* (2014.01)

(52) U.S. Cl.
CPC ........ *B23K 26/1438* (2015.10); *B23K 26/147* (2013.01); *B23K 26/1476* (2013.01); *B23K 26/1494* (2013.01); *B23K 26/21* (2015.10); *B23K 26/36* (2013.01)

(58) Field of Classification Search
CPC .............................. B23K 26/21; B23K 26/1438; B23K 26/1476; B23K 26/1494; B23K 26/0884; B23K 26/082; B23K 26/08; B23K 26/142; B23K 2103/08; B23K 2101/34

See application file for complete search history.

(56) References Cited

U.S. PATENT DOCUMENTS

| 5,359,176 A | 10/1994 | Balliet, Jr. et al. | |
|---|---|---|---|
| 2001/0040149 A1 | 11/2001 | Otsubo et al. | |
| 2005/0206894 A1* | 9/2005 | Fukuda | B23K 26/147 356/318 |
| 2007/0210040 A1* | 9/2007 | Sakamoto | B23K 26/0884 219/121.63 |
| 2014/0113797 A1* | 4/2014 | Yamada | C03B 33/091 501/11 |
| 2016/0354866 A1* | 12/2016 | Broghammer | B23K 26/1435 |

(Continued)

FOREIGN PATENT DOCUMENTS

| DE | 102014103635 A1 | 9/2015 |
|---|---|---|
| JP | H06-285668 A | 10/1994 |
| JP | 2007-268610 A | 10/2007 |

(Continued)

*Primary Examiner* — Brian W Jennison
(74) *Attorney, Agent, or Firm* — Oliff PLC (57) ABSTRACT

A laser welding device includes: a laser scanner body configured to emit a laser beam to a workpiece; a jet nozzle configured to jet gas so as to cause the gas to cross an optical path of the laser beam emitted from the laser scanner body; and a guide plate disposed on the downstream side in the flow direction of the gas, from the optical path of the laser beam emitted from the laser scanner body. The guide plate is configured to change the flow direction of the gas that has crossed the optical path of the laser beam into a direction away from a laser irradiation position on the workpiece toward the downstream side in the flow direction of the gas.

6 Claims, 8 Drawing Sheets

(56) References Cited

U.S. PATENT DOCUMENTS

2017/0072468 A1* 3/2017 Schilling ................. B28B 1/001

FOREIGN PATENT DOCUMENTS

| JP | 2014-079784 A | 5/2014 |
| JP | 8195668 U | 1/2015 |
| JP | 2015-217423 A | 12/2015 |
| WO | 2003/076117 A1 | 9/2003 |

* cited by examiner

RELATED ART

LASER WELDING DEVICE

INCORPORATION BY REFERENCE

The disclosure of Japanese Patent Application No, 2017-109377 filed on Jun. 1, 2017 including the specification, drawings and abstract is incorporated herein by reference in its entirety.

BACKGROUND

1. Technical Field

The present disclosure relates to a laser welding device.

2. Description of Related Art

Conventionally, as described in Japanese Unexamined Patent Application Publication No, 2007-268610 (JP 2007-268610 A), for example, a laser scanner (also called a scanner head) of a laser welding device is provided with a cover-glass that is provided in front of (on a laser-beam irradiation side from) a mirror and a lens constituting a laser optical system. This prevents spatters dispersed from a machining point (a laser irradiation position on a workpiece) during laser beam welding from hitting the mirror and the lens, thereby protecting the mirror and the lens.

Further, in JP 2007-268610 A, air is fed in a direction crossing an optical path of a laser beam emitted from the laser scanner (hereinafter, the flow of the air is referred to as an air blow), so that the spatters are swept away and removed by the air blow, thereby preventing the spatters from being attached to the cover-glass. This prevents such a situation that, at the time when laser irradiation is performed in a state where the spatters are attached to the cover-glass, the spatters absorb heat so that sufficient energy of the laser beam does not reach the laser irradiation position on the workpiece, or the cover-glass is damaged.

SUMMARY

However, in a case where a structural object such as a part of the workpiece or another workpiece exists on the downstream side in the flow direction of the air that has crossed the optical path of the laser beam, when the flow line of the air blow hits the structural object, the flow-line direction of the air blow might be changed (the flow-line direction might be reversed) by the structural object, so that the air might flow into the laser irradiation position on the workpiece.

Figure 9:
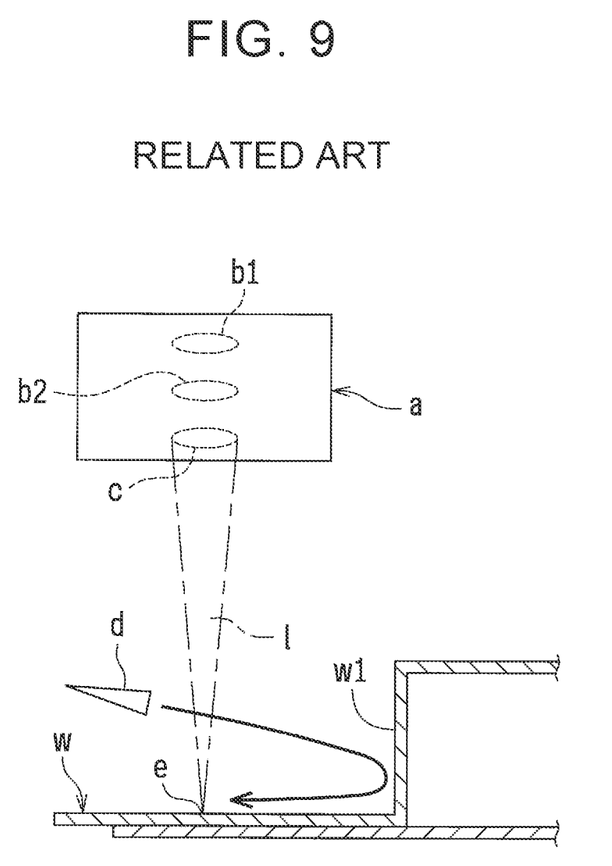
FIG. 9 is a schematic view to describe a problem of an air blow in the related art.

FIG. 9 is a schematic view to describe a problem of the air blow in the related art. As illustrated in FIG. 9, two lenses b1, b2 are accommodated in a laser scanner a, and a cover-glass c is attached near a laser-beam emission opening in the laser scanner a. An air blow nozzle d configured to jet air is disposed on the left side in the figure. As illustrated in FIG. 9, in a case where a vertical portion w1 as a part of a workpiece w exists on the downstream side in the flow direction of the air that has crossed an optical path 1 of a laser beam, the flow line of an air blow hits the vertical portion w1, so that the flow-line direction is reversed and the air flows into a laser irradiation position e on the workpiece w (see the arrow in the figure).

In such a situation, a machining environment at the laser irradiation position e is disturbed (e.g., an air supply amount to the laser irradiation position e becomes excessive), so that poor welding might occur.

The present disclosure provides a laser welding device that is able to restrain a gas from flowing into a laser irradiation position on a workpiece at the time when the gas is fed in a direction crossing an optical path of a laser beam.

A first aspect of the present disclosure relates to a laser welding device including a laser scanner body, a jet nozzle, and a guide plate. The laser scanner body is configured to emit a laser beam to a workpiece. The jet nozzle is configured to jet a gas from a first side to a second side so as to cause the gas to cross an optical path of the laser beam thus emitted from the laser scanner body. The guide plate is disposed on the downstream side in the flow direction of the gas, from the optical path of the laser beam. The guide plate is extended in a direction away from a laser irradiation position on the workpiece toward the second side, such that the flow direction of the gas that has crossed the optical path of the laser beam is changed into the direction away from the laser irradiation position on the workpiece toward the downstream side in the flow direction of the gas.

In the first aspect, in a case where laser beam welding is performed by emitting the laser beam toward the workpiece from the laser scanner body, even if spatters are dispersed from the laser irradiation position on the workpiece toward the laser scanner body, the spatters are swept away by the gas jetted from the jet nozzle, so that the spatters can hardly reach the laser scanner body. After the gas thus jetted from the jet nozzle has crossed the optical path of the laser beam, the gas is guided by the guide plate, so that its flow direction is changed into the direction away from the laser irradiation position on the workpiece toward the downstream side. On this account, even in a case where a structural object such as a part of the workpiece or another workpiece exists on the extension line of the flow direction of the gas that has crossed the optical path of the laser beam (on the extension line of the flow direction of the gas on the assumption that the flow direction is not changed), the gas is prevented from hitting the structural object, thereby restraining such a situation that the flow direction of the gas is reversed by the structural object and the gas flows into the laser irradiation position on the workpiece. As a result, it is possible to restrain a machining environment at the laser irradiation position on the workpiece from being disturbed and to restrain the occurrence of poor welding.

Further, in the laser welding device according to the first aspect, a first end of the guide plate on the upstream side in the flow direction of the gas may be continuously provided with an introduction plate disposed on the downstream side in the flow direction of the gas, from the optical path of the laser beam, the introduction plate being extended in a direction along the flow direction of the gas that has crossed the optical path of the laser beam.

With the configuration, the flow of the gas that has jetted from the jet nozzle and crossed the optical path of the laser beam is guided by the introduction plate extended along the flow direction of the gas, and then, the flow direction of the gas is changed by the guide plate into the direction away from the laser irradiation position on the workpiece toward the downstream side. The upstream edge of the guide plate in the flow direction of the gas serves as a starting point at which the flow direction of the gas is changed (the flow line of the gas hits the guide plate). Along with this, in the upstream edge of the guide plate in the flow direction of the gas, the pressure increases, so that the flow rate of the gas might decrease. However, the first end of the guide plate on the upstream side in the flow direction of the gas is set at a position away from the optical path of the laser beam due to the presence of the introduction plate, so that the first end of the guide plate rarely affects the flow rate of the gas crossing the optical path of the laser beam. That is, it is possible to maintain a high flow rate of the gas crossing the optical path of the laser beam, thereby making it possible to sufficiently obtain a spatter sweeping effect by the gas.

Further, the flow of the gas that has crossed the optical path of the laser beam (the flow of the gas before the gas reaches the guide plate) is guided by the introduction plate. Accordingly, the introduction plate restrains the flow of the gas that has crossed the optical path of the laser beam from spreading (spreading toward the laser irradiation position on the workpiece), and then, the guide plate can change the flow direction of the gas. On this account, it is possible to restrain such a situation that the flow of the gas spreads and the gas partially flows into the laser irradiation position on the workpiece, so that the machining environment at the laser irradiation position is disturbed.

In the laser welding device according to the first aspect, the jet nozzle may include a plurality of jet nozzles, and the jet nozzles may be placed to face a direction where gases jetted from the jet nozzles and mixed with each other flow toward a boundary part between the introduction plate and the guide plate.

With the configuration, a large part of the gas jetted from each of the jet nozzles can flow generally over the entire guide plate in its lengthwise direction (the direction along the flow of the gas), thereby making it possible to cause the flow direction of the gas to be surely directed to the direction away from the laser irradiation position on the workpiece. This makes it possible to restrain the gas from partially flowing into the laser irradiation position on the workpiece.

The laser welding device according to the first aspect of the present disclosure may further include a fume entrapment restraining plate disposed at a position where the fume entrapment restraining plate faces the guide plate via a predetermined interval with a circulation space being sandwiched between the fume entrapment restraining plate and the guide plate, the circulation space being a space through which the gas that has crossed the optical path of the laser beam flows. The fume entrapment restraining plate is configured to restrain fume from flowing-in toward the optical path of the laser beam.

The gas guided by the guide plate after the gas has crossed the optical path of the laser beam entraps fume (metal vapor or the like caused due to sublimation of a metallic material of the workpiece) existing around the gas. Here, since the fume entrapment restraining plate is disposed at a position where the fume entrapment restraining plate faces the guide plate via the predetermined interval, a region where the fume is entrapped, in the space through which the gas flows, is a region deviating from the fume entrapment restraining plate, that is, a region away from the optical path of the laser beam. Hereby, the fume entrapment restraining plate restrains the fume from flowing-ire toward the optical path of the laser beam or the laser-beam emission side of the laser scanner body. As a result, it is possible to restrain such a situation that the fume flows into the optical path of the laser beam or the fume is attached to a laser-beam emission part (e.g., a cover-glass or the like) of the laser scanner body, so that sufficient energy of the laser beam to reach the laser irradiation position on the workpiece cannot be obtained.

Further, in the laser welding device according to the first aspect, the fume entrapment restraining plate may be configured such that a surface on a side facing the laser irradiation position on the workpiece is formed in a recessed curved surface.

When spatters dispersed from the laser irradiation position on the workpiece hit the fume entrapment restraining plate (the surface of the fume entrapment restraining plate on the side facing the laser irradiation position on the workpiece), the spatters rebound from the fume entrapment restraining, plate. However, since the surface of the fume entrapment restraining plate on the side facing the laser irradiation position on the workpiece is formed in a recessed curved surface, the spatters are restrained from rebounding toward the laser scanner body. That is, the fume entrapment restraining plate restrains the spatters from rebounding toward the laser scanner body and being attached to the laser-beam emission part (e.g., the cover-glass or the like). Hereby, while a function of the fume entrapment restraining plate (a function to restrain the fume from flowing-in toward the optical path of the laser beam or the laser-beam emission side of the laser scanner body) is maintained, it is possible to restrain the spatters from being attached to the laser-beam emission part of the laser scanner body due to the presence of the fume entrapment restraining plate.

In the laser welding device according to the first aspect, the jet nozzle may be included in an air blow unit attached to a laser emission surface of the laser scanner body.

In the laser welding device according to the first aspect, the jet nozzle may include a plurality of jet nozzles, and the jet nozzles may include a first jet nozzle and a second jet nozzle. The first jet nozzle and the second jet nozzle may be placed in order of the second jet nozzle and the first jet nozzle along the direction where the laser beam is emitted. The second jet nozzle may be placed such that a second flow-line direction of a gas jetted from the second jet nozzle is inclined with a predetermined inclination toward the laser irradiation position from a reference line connecting a position where the second jet nozzle is placed to the optical path of the laser beam in a perpendicular manner to the optical path of the laser beam, and the predetermined inclination of the second flow-line direction is larger than an inclination of a first flow-line direction of a gas jetted from the first jet nozzle, the first flow-line direction being inclined with the inclination toward the laser irradiation position from a reference line connecting a position where the first jet nozzle is placed to the optical path of the laser beam in a perpendicular manner to the optical path of the laser beam.

In the present disclosure, the guide plate configured to change the flow direction of the gas that has crossed the optical path of the laser beam emitted from the laser scanner body into a direction away from the laser irradiation position on the workpiece is provided. Hereby, it is possible to restrain the gas that has crossed the optical path of the laser beam from flowing into the laser irradiation position on the workpiece, and to restrain a machining environment at the laser irradiation position from being disturbed, thereby making it possible to restrain the occurrence of poor welding.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure is described below with reference to drawings. The present embodiment deals with a case where the present disclosure is applied to a laser welding device used in a manufacturing process of a vehicle body for an automobile. Particularly, the present embodiment describes a case where the present disclosure is applied to a laser welding device that can perform remote laser welding.

Schematic Configuration of Laser Welding Device

Figure 1:
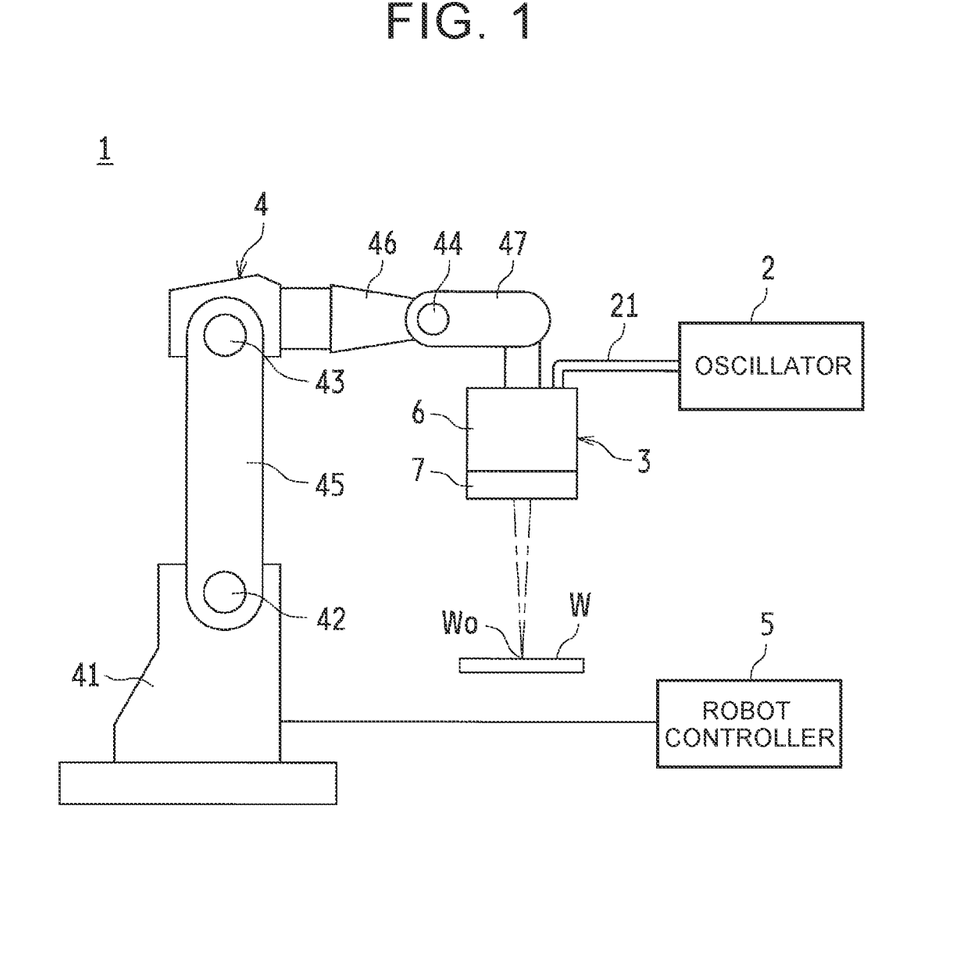
FIG. 1 is a schematic configuration diagram illustrating a laser welding device according to an embodiment.

FIG. 1 is a schematic configuration diagram illustrating a laser welding device 1 according to the present embodiment. As illustrated in FIG. 1, the laser welding device 1 includes a laser oscillator 2, a laser scanner 3, a welding robot 4, and a robot controller 5.

The laser oscillator 2 generates a laser beam. The laser beam thus generated is guided to the laser scanner 3 via an optical fiber cable 21. As the laser beam, a carbon dioxide laser, a YAG laser, a fiber laser, and the like can be used, for example.

The laser scanner 3 applies the laser beam (see an alternate long and short dash line in FIG. 1) guided through the optical fiber cable 21 to a workpiece W constituted by steel sheets (a plurality of steel sheets laminated on top of one another). A lens group and a plurality of mirrors (not shown) are accommodated in the laser scanner 3. As the lens group, a collimating lens that collimates the laser beam, a condensing lens that condenses the laser beam so as to be focused at a machining point of the workpiece W (at a predetermined laser irradiation position Wo on the workpiece W), and the like are provided. Further, each of the mirrors is configured to be rotatable around one rotation axis. A predetermined range of the workpiece W can be scanned with the laser beam such that the scanning with the laser beam is performed by use of the mirrors. Hereby, the application direction of the laser beam can be changed without moving the laser scanner 3, and the laser irradiation position Wo on the workpiece W can be moved within a predetermined region. The mirrors can be constituted by using a galvanometer mirror, for example.

The welding robot 4 is configured to move the laser scanner 3. The welding robot 4 is constituted by an articulated robot. More specifically, in the present embodiment, the welding robot 4 includes a base stand 41, a rotating mechanism (not shown) accommodated inside the base stand 41, joints 42, 43, 44, and arms 45, 46, 47. Due to a rotative motion of the rotating mechanism and swinging operations of the arms 45, 46, 47 via the joints 42, 43, 44, the laser scanner 3 can be moved in a given direction.

Information (information such as the amount of rotation angle of each joint 42, 43, 44, and the like) to move the laser scanner 3 toward a welding part is stored in the robot controller 5 in advance by off-line teaching. When the vehicle body is conveyed to a welding process on a vehicle body manufacturing line, the welding robot 4 operates based on the information in response to a control signal from the robot controller 5, so that laser beam welding is performed on welding parts sequentially.

Configuration of Laser Scanner

Figure 2:
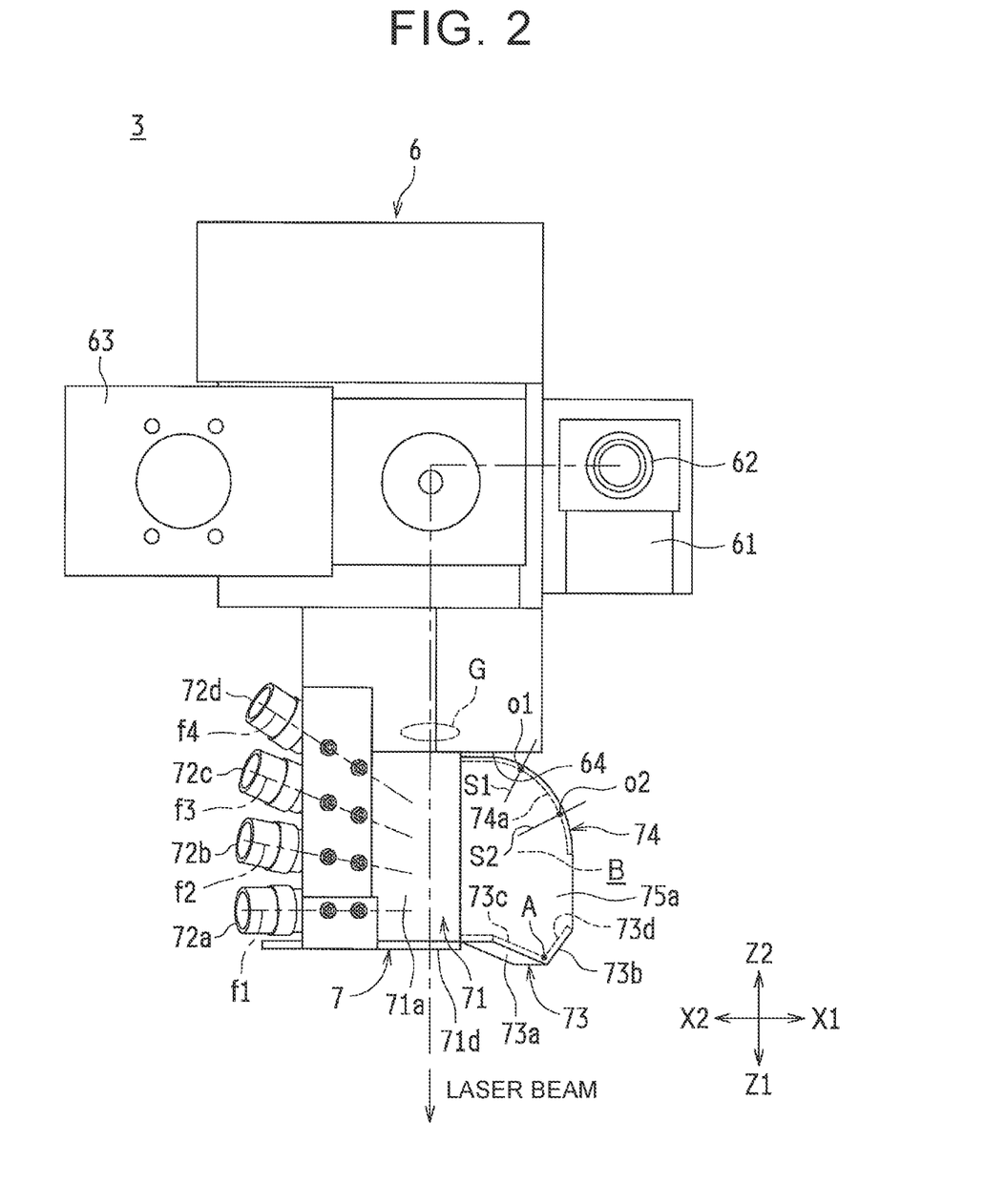
FIG. 2 is a front view illustrating a part of a laser scanner in a simplified manner.
Figure 3:
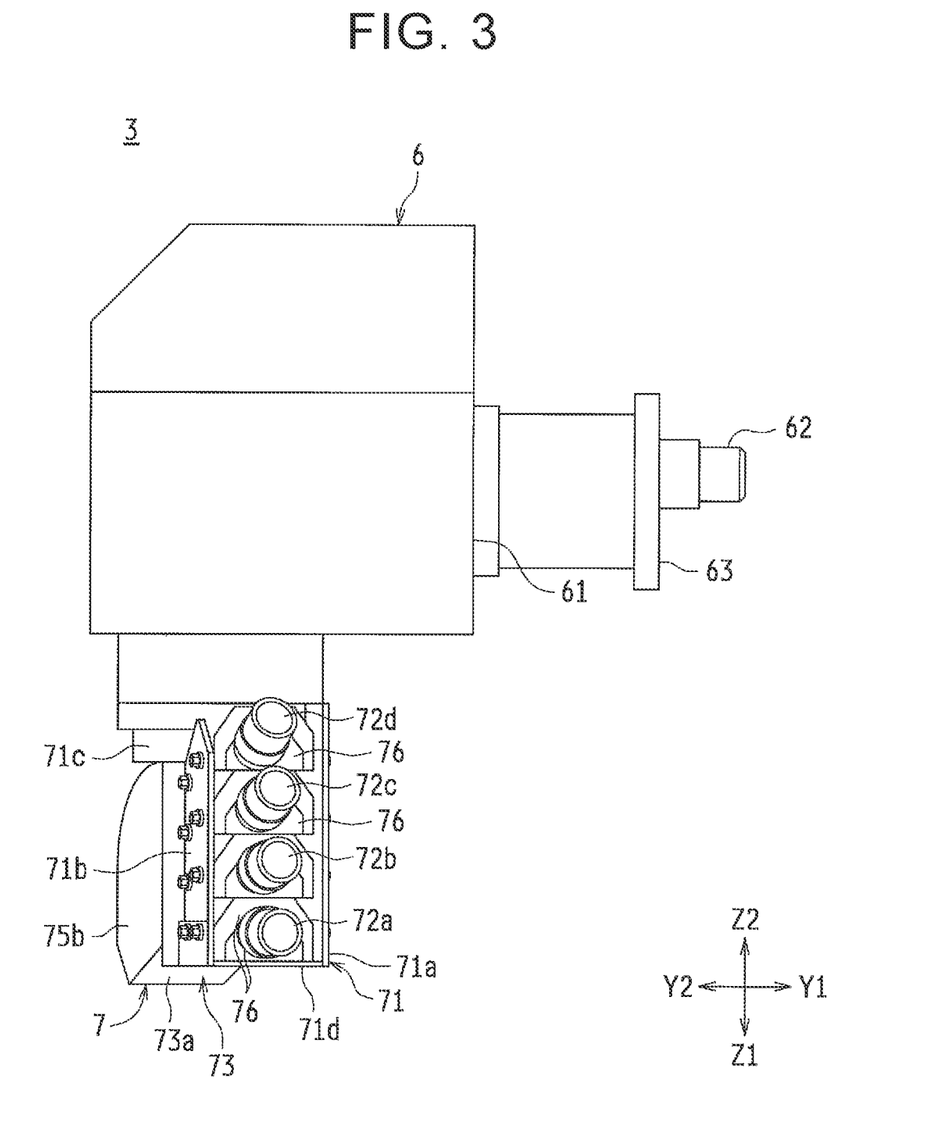
FIG. 3 is a left side view illustrating a part of the laser scanner in a simplified manner.
Figure 4:
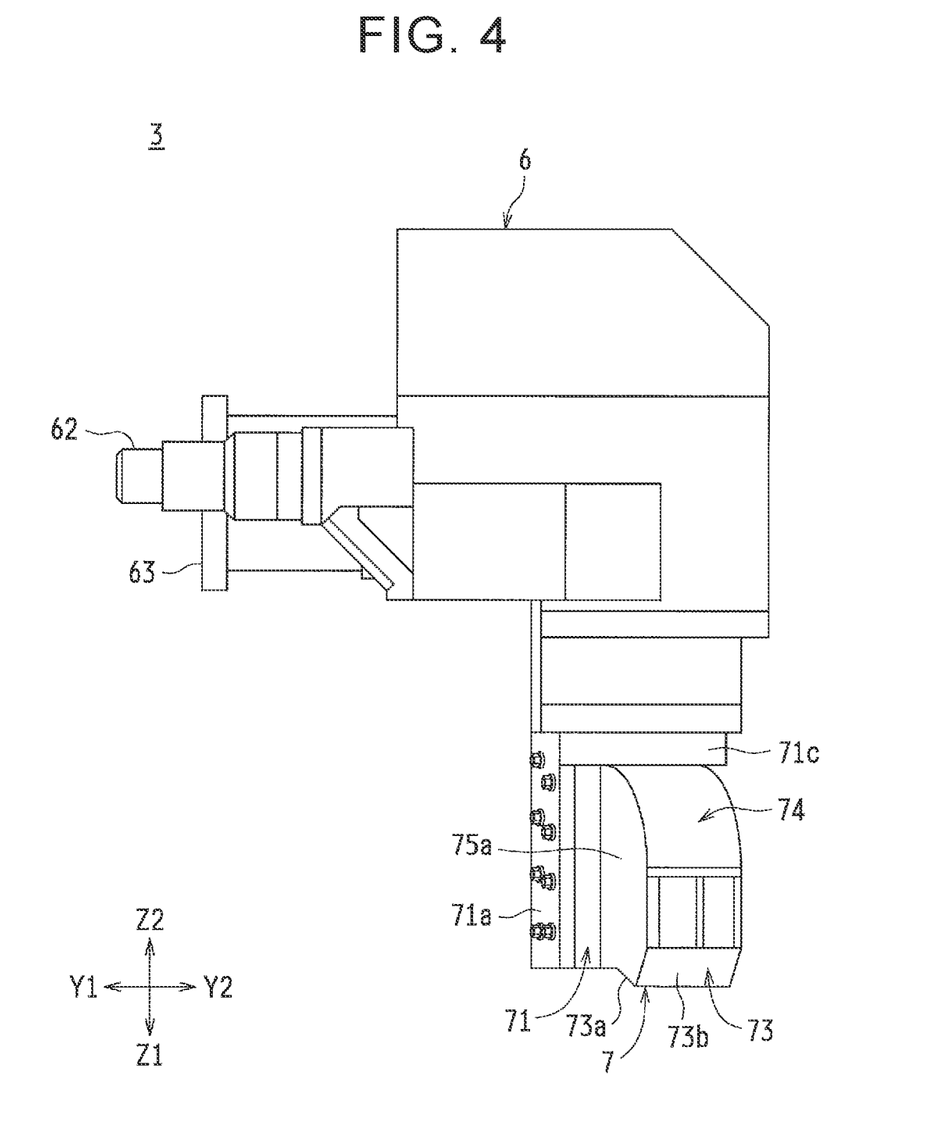
FIG. 4 is a right side view illustrating a part of the laser scanner in a simplified manner.
Figure 5:
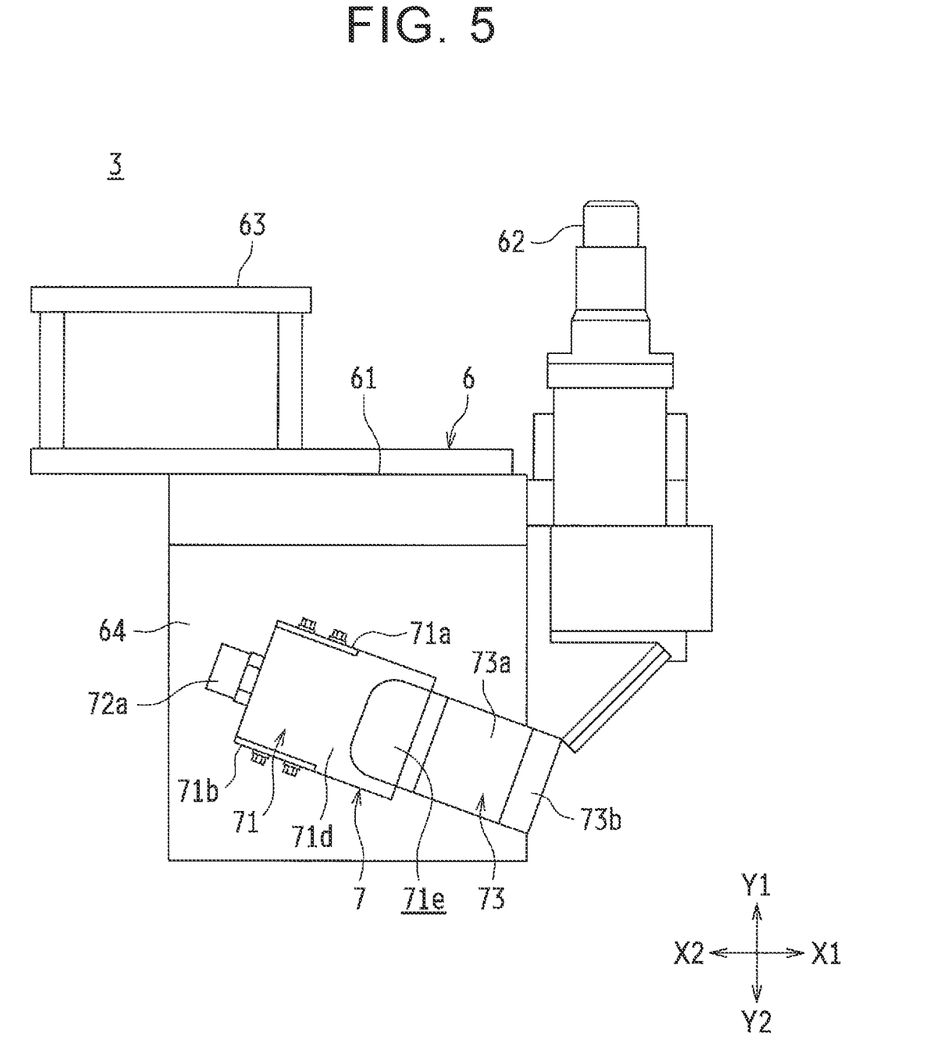
FIG. 5 is a bottom view illustrating a part of the laser scanner in a simplified manner.
Figure 6:
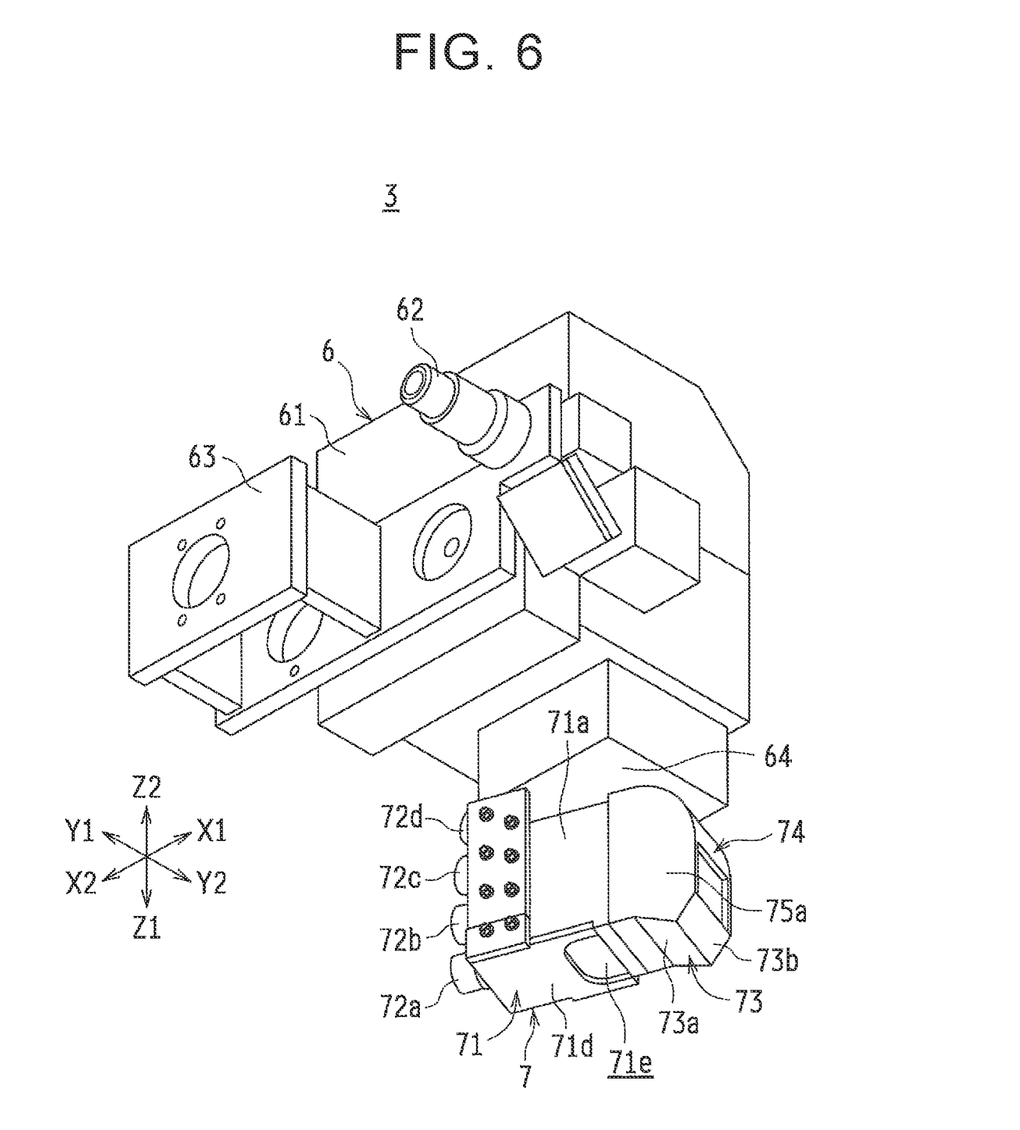
FIG. 6 is a perspective view illustrating a part of the laser scanner in a simplified manner.

Next will be described a configuration of the laser scanner 3. FIGS. 2 to 6 are views illustrating a part (a laser scanner body 6 described later) of the laser scanner 3 in a simplified manner when the application direction of the laser beam is directed downward. FIG. 2 is a front view, FIG. 3 is a left side view, FIG. 4 is a right side view, FIG. 5 is a bottom view, and FIG. 6 is a perspective view (a perspective view when viewed from a diagonally lower side).

In the following description, a direction (the up-down direction in FIG. 2) along the optical axis of the condensing lens is assumed a Z-direction. Further, a direction that is perpendicular to the Z-direction and along the width direction (the right-left direction in FIG. 2) of the laser scanner 3 is assumed an X-direction. Further, a direction that is perpendicular to the Z-direction and along the thickness direction (the right-left direction in FIG. 3) of the laser scanner 3 is assumed a Y-direction. In the Z-direction, the lower side (a direction toward which the laser beam is emitted) in FIG. 2 is referred to as a Z1-direction, and the upper side in FIG. 2 is referred to as a Z2-direction. Further, in the X-direction, the right side in FIG. 2 is referred to as an X1-direction and the left side in FIG. 2 is referred to as an X2-direction. Further, in the Y-direction, the right side in FIG. 3 is referred to as a Y1-direction and the left side in FIG. 3 is referred to as a Y2-direction.

As illustrated in FIGS. 2 to 6, the laser scanner 3 includes the laser scanner body 6 and an air blow unit 7.

Laser Scanner Body

The laser scanner body 6 is configured to emit a laser beam toward the workpiece W (see FIG. 1), and the lens group, the mirrors, and the like are accommodated inside the laser scanner body 6. A connector 62 to which the optical fiber cable 21 is connected is provided on a side face (a side face disposed on the Y1-direction side) 61 of the laser scanner body 6. That is, the laser beam guided into the laser scanner body 6 through the connector 62 is changed in direction by the mirrors (the direction of the laser beam is changed from the Y2-direction to the X2-direction, and then changed to the Z1-direction; see an alternate long and short dash line in FIG. 2 indicative of the optical axis of the laser beam), and then, the laser beam passes through the internal space of the air blow unit 7 so as to be emitted toward the workpiece W.

Further, an arm attachment portion 63 to which the arm 47 of the welding robot 4 is connected is provided on the side face (the side face disposed on the Y1-direction side) 61 of the laser scanner body 6.

Air Blow Unit

Next will be described the air blow unit 7 that is a characterized part in the present embodiment.

The air blow unit 7 is configured to feed air (gas) in a direction crossing the optical path L (see FIG. 7) of the laser beam emitted from the laser scanner body 6, so as to prevent spatters from being attached to a cover-glass G (see a broken line in FIGS. 2 and 7) attached near an emission opening of the laser scanner body 6. The spatters are dispersed from the laser irradiation position Wo on the workpiece W at the time of laser beam welding.

The air blow unit 7 is attached to a laser emission surface 64 (a surface disposed on the Z1-direction side; the bottom surface in FIG. 2) of the laser scanner body 6. The air blow unit 7 includes a unit body 71, air blow nozzles (jet nozzles) 72a to 72d, a guide fin 73, and a fume entrapment restraining plate 74.

The unit body 71 is configured such that a plurality of flat-shaped panels 71a to 71d is assembled integrally with each other. More specifically, the unit body 71 is configured such that a front panel 71a disposed on the Y1-direction side, a rear panel 71b disposed on the Y2-direction side so as to face the front panel 71a, an incident-side panel 71c disposed on the Z2-direction side, and an emission-side panel 71d disposed on the Z1-direction side so as to face the incident-side panel 71c are assembled integrally with each other. The incident-side panel 71c is attached to the laser emission surface 64 of the laser scanner body 6 by means of bolting and the like.

Openings 71e (among the openings, only the opening 71e of the emission-side panel 71d is illustrated in FIGS. 5 and 6) through which the laser beam is passed is formed in the incident-side panel 71c and the emission-side panel 71d at respective positions through which the optical axis of the laser beam passes. Hereby, the space (the internal space of the unit body 71) surrounded by the panels 71a to 71d is configured as a passage space for the laser beam. The laser welding device 1 according to the present embodiment can perform remote laser welding that changes the application direction of the laser beam without moving the laser scanner 3 (scans a predetermined range of the workpiece W with the laser beam) (see optical paths L1, L2 of the laser beam in FIG. 7). On this account, the opening 71e is formed as a relatively large opening in order to correspond to the scanning range of the laser beam. Note that the internal space of the unit body 71 is also configured as an air blow space (the space where the air is fed to sweep the spatters away) as will be described later.

The air blow nozzles 72a to 72d are configured to jet air from a first side (the X2-direction side) to a second side (the X1-direction side) so as to cross the optical path L of the laser beam emitted from the laser scanner body 6. The air blow nozzles 72a to 72d are disposed in a part of the unit body 71 on the X2-direction side. In the present embodiment, four air blow nozzles 72a to 72d are provided. The air blow nozzles 72a to 72d are placed in a line along the Z-direction in the part of the unit body 71 on the X2-direction side, and their distal ends (distal ends on the X1-direction side) are opened in the internal space of the unit body 71. More specifically, the air blow nozzles 72a to 72d are supported by respective nozzle fixed brackets 76 (see FIG. 3). The nozzle fixed brackets 76 are fixed to the front panel 71a and the rear panel 71b of the unit body 71 by means of bolting and the like such that the air blow nozzles 72a to 72d are supported by the unit body 71 and their distal ends are opened in the internal space of the unit body 71.

An air pump is connected to the air blow nozzles 72a to 72d via an air supply pipe (not shown). The air pumped by the air pump is split into the air blow nozzles 72a to 72d, so that the air is jetted from the air blow nozzles 72a to 72d toward the internal space of the unit body 71.

The air blow nozzles 72a to 72d have slightly different center-line directions, so that their air-jet directions are accordingly different from each other. Herein, among the four air blow nozzles 72a to 72d, the air blow nozzle 72a disposed closest to the Z1-direction side (the lower side in FIG. 2) is referred to as a first air blow nozzle 72a, and the air blow nozzle 72b adjacent to the Z2-direction side of the first air blow nozzle 72a is referred to as a second air blow nozzle 72b. Similarly, the air blow nozzles placed sequentially toward the Z2-direction side are referred to as a third air blow nozzle 72c and a fourth air blow nozzle 72d.

The air blow nozzles 72a to 72d are placed as follows. That is, an air blow nozzle disposed closer to the Z2-direction side is placed such that the extension direction of its center line is inclined more toward the Z1-direction side (inclined downward) as it goes toward the nozzle distal side. On this account, as the air blow nozzle is disposed closer to the Z2-direction side, the flow-line direction of the air jetted from the air blow nozzle is inclined more toward the Z1-direction side (directed downward). An alternate long and short dash line f1 in FIG. 2 indicates the flow-line direction of the air jetted from the first air blow nozzle 72a (the flow-line direction is along the X1-direction), an alternate long and short dash line f2 indicates the flow-line direction of the air jetted from the second air blow nozzle 72b, an alternate long and short dash line f3 indicates the flow-line direction of the air jetted from the third air blow nozzle 72c, and an alternate long and short dash line f4 indicates the flow-line direction of the air jetted from the fourth air blow nozzle 72d.

When the air is jetted from each of the air blow nozzles 72a to 72d, the air flows through the internal space of the unit body 71 as an air blow, so that the air flows in a direction slightly inclined toward the Z1-direction side (a diagonally downward direction in FIG. 2) from the X1-direction in the internal space of the unit body 71. The dispersion direction of spatters at the time when the spatters are dispersed from the laser irradiation position Wo on the workpiece W and enter the internal space of the unit body 71 at the time of laser beam welding is the Z2-direction or a direction slightly inclined from the Z2-direction. In the meantime, the flow direction of the air flowing through the internal space of the unit body 71 is inclined toward the Z1-direction side. That is, the flow of the air has a flow component (a flow component in the Z1-direction) in a reverse direction from the dispersion direction of the spatters. On this account, even if the spatters enter the internal space of the unit body 71, the spatters are swept away by the air blow so as to be removed without allowing the spatters to reach the cover-glass G, thereby making it possible to prevent the spatters from being attached to the cover-glass G.

The guide fin 73 is disposed on the downstream side in the flow direction of the air from the optical path L of the laser beam emitted from the laser scanner body 6 (the optical path of the laser beam in the internal space of the unit body 71) and is configured to guide the flow direction of the air jetted from each of the air blow nozzles 72a to 72d.

The guide fin 73 is constituted by an introduction plate 73a disposed on the upstream side in the flow direction of the air, and a guide plate 73b continuing from the downstream edge of the introduction plate 73a in the flow direction of the air. More Specifically, one metal plate is bent at a predetermined angle, so that a first side (the X2-direction side) of the bent part serves as the introduction plate 73a, and a second side (the X1-direction side) thereof serves as the guide plate 73b. The introduction plate 73a and the guide plate 73b will be described below.

The introduction plate 73a is made of a flat-shaped metal plate, and a first edge (the edge on the X2-direction side) thereof is joined to the unit body 71 by means of welding and the like. Further, a large part of a surface (a top surface in FIG. 2) 73c of the introduction plate 73a on the Z2-direction side continues from a surface (a top surface extending along the X-direction in FIG. 2) of the emission-side panel 71d on the Z2-direction side, and the large part of the surface 73c is inclined from the surface of the emission-side panel 71d at a predetermined inclination angle toward the Z1-direction side (inclined in the Z1-direction toward the X1-direction). More specifically, the surface 73c of the introduction plate 73a on the Z2-direction side is slightly inclined from the X-direction so as to go along the flow-line direction in a state where the air jetted from the air blow nozzles 72a to 72d is mixed (the surface 73c is inclined downward (toward the Z1-direction side) in FIG. 2). In other words, the introduction plate 73a extends in the direction along the flow direction of the air that has crossed the optical path L of the laser beam passing through the internal space of the unit body 71, so as to guide the flow of the air that has crossed the optical path L of the laser beam. For example, the introduction plate 73a is inclined at an inclination angle of around 25° toward the Z1-direction as it goes toward the X1-direction.

The guide plate 73b is made of a flat-shaped metal plate continuing from the edge of the introduction plate 73a on the X1-direction side, and is inclined at a predetermined inclination angle toward the Z2-direction as it goes from a second edge (the edge on the X1-direction side) of the introduction plate 73a toward the X1-direction. That is, a surface (a top surface in FIG. 2) 73d of the guide plate 73h on the Z2-direction side is inclined at a predetermined inclination angle toward the Z2-direction as it goes toward the X1-direction. For example, in the state illustrated in FIG. 2, the surface 73d is inclined at an inclination angle of around 50° from the horizontal direction (the X-direction). That is, the guide plate 73h is configured such that the flow direction (the flow direction of the air that has crossed the optical path L of the laser beam) of the air flowing along the introduction plate 73a after the air has passed through the internal space of the unit body 71 (after the air has crossed the optical path L of the laser beam) goes along a direction inclined at a predetermined inclination angle toward the Z2-direction as it goes toward the X1-direction. That is, the guide plate 73b is configured to guide the flow direction of the air so as to be changed into a direction away from the laser irradiation position Wo on the workpiece W toward the downstream side of the flow direction. The guide plate 73b corresponds to "a guide plate disposed on the downstream side in the flow direction of the gas from the optical path of the laser beam, the guide plate being extended in a direction away from a laser irradiation position on the workpiece toward the second side (the X1-direction side), so that the flow direction of the gas that has crossed the optical path of the laser beam is changed into the direction away from the laser irradiation position on the workpiece toward the downstream side in the flow direction of the gas" in the present disclosure.

A boundary part A between the introduction plate 73a and the guide plate 73b, that is, a part A where the downstream edge of the introduction plate 73a in the flow direction of the air is connected to the upstream edge of the guide plate 73b in the flow direction of the air is disposed on a passage where the air flows in a state where the air jetted from the air blow nozzles 72a to 72d is mixed. In other words, the air blow nozzles 72a to 72d are placed to face a direction where the air jetted from the air blow nozzles 72a to 72d and mixed is directed to the boundary part A between the introduction plate 73a and the guide plate 73b (the part as the downstream edge of the introduction plate 73a in the flow direction of the air and as the upstream edge of the guide plate 73b in the flow direction of the air).

The fume entrapment restraining plate 74 is configured to restrain entrapment of fume (metal vapor or the like caused due to sublimation of a metallic material of the workpiece W) toward the optical path L of the laser beam, and is made of a metal plate having an arcuate shape (a shape thereof when viewed from the Y-direction is an arcuate shape) and placed at a position where the fume entrapment restraining plate 74 faces the guide fin 73 via a predetermined interval with a circulation space B being sandwiched therebetween. The circulation space B is a space through which the air having crossed the optical path L of the laser beam flows. One edge (the edge on the X2-direction side) of the fume entrapment restraining plate 74 is joined to the unit body 71 by means of welding and the like.

Further, the arcuate shape of the fume entrapment restraining plate 74 (the shape of a surface 74a (hereinafter also referred to as an inner surface 74a) of the fume entrapment restraining plate 74 on the side facing the laser irradiation position Wo on the workpiece W) is a recessed curved surface. Hereby, the fume entrapment restraining plate 74 is formed in a shape that causes the spatters to rebound in the direction between the Z1-direction and the X2-direction so that the rebounding direction of the spatters is not directed toward the laser-scanner-body-6 side at the time when the spatters enter the internal space of the unit body 71 and hit the inner surface 74a of the fume entrapment restraining plate 74.

More specifically, the fume entrapment restraining plate 74 has an inner-surface shape in which directions perpendicular to tangents at respective positions over the entire inner surface 74a of the fume entrapment restraining plate 74 are directed between the Z1-direction and the X2-direction (for example, see a virtual straight line S1 perpendicular to a tangent at a point O1 and a virtual straight line S2 perpendicular to a tangent at a point O2 in FIG. 2).

Further, cover plates 75a, 75b are provided over respective edges of the guide fin 73 and the fume entrapment restraining plate 74 on the Y1-direction side and over respective edges thereof on the Y2-direction side. That is, the cover plate 75a on the front-face side is provided over the respective edges of the guide fin 73 and the fume entrapment restraining plate 74 on the Y1-direction side, and the cover plate 75b on the hack-face side is provided over the respective edges of the guide fin 73 and the fume entrapment restraining plate 74 on the Y2-direction side. As the outer-edge shapes of the cover plates 75a, 75h, their edges disposed on the Z1-direction side are generally fitted to the shapes of the introduction plate 73a and the guide plate 73h of the guide fin 73, and their edges disposed on the Z2-direction side are generally fitted to the shape of the fume entrapment restraining plate 74. Further, respective edges of the cover plates 75a, 75b oil the X2-direction side are joined to the unit body 71. Hereby, the air blow unit 7 is formed in a duct shape by the unit body 71, the guide fin 73, the fume entrapment restraining plate 74, and the cover plates 75a, 75b. Hereby, the air jetted from each of the air blow nozzles 72a to 72d flows through the internal space of the unit body 71, and then, the air is discharged outside the air blow unit 7 via the space formed between the guide plate 73b of the guide fin 73 and the fume entrapment restraining plate 74 (see an arrow Ai indicative of the flow of the air in FIG. 7).

Laser Welding Operation

Next will be described a laser welding operation of the laser welding device 1 configured as described above.

Figure 7:
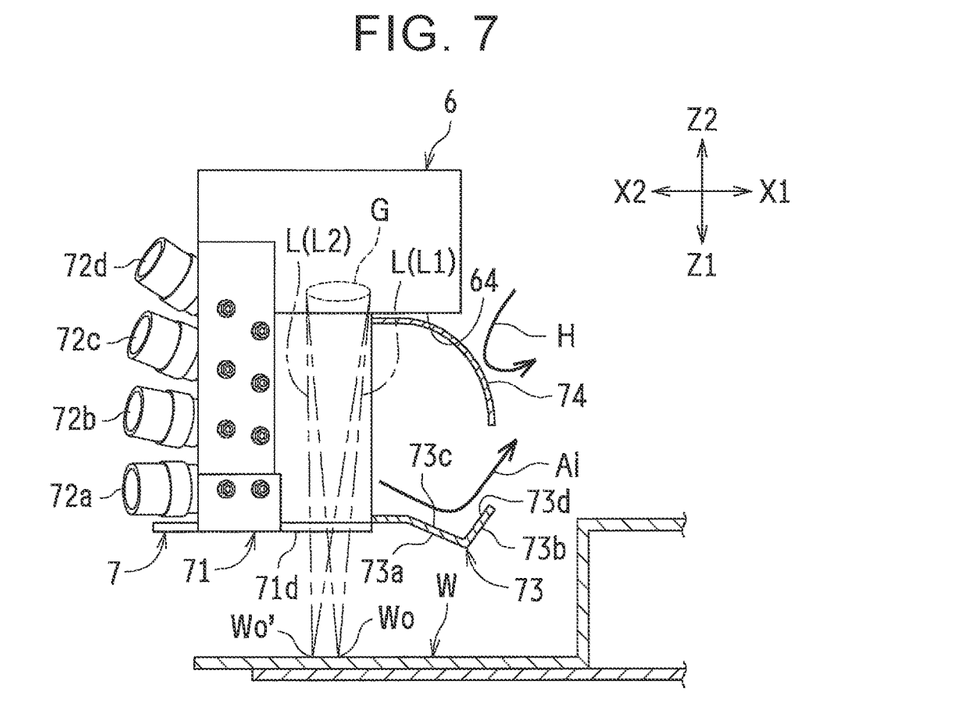
FIG. 7 is a view to describe a laser welding operation of the laser welding device according to the embodiment.

When the vehicle body is conveyed to the welding process on the vehicle body manufacturing line, the welding robot 4 operates based on the information in response to the control signal from the robot controller 5. Hereby, the laser scanner body 6 is moved to a predetermined position, so that laser beam welding to apply a laser beam to a machining position as a target is performed. At this time, as illustrated in FIG. 7, after the laser beam passes through the emission opening formed on the laser emission surface 64 of the laser scanner body 6, the cover-glass G, and the opening of the incident-side panel 71c, the laser beam passes through the internal space of the unit body 71, and then, the laser beam is applied to a predetermined laser irradiation position Wo on the workpiece W from the opening 71e (see FIG. 6) of the emission-side panel 71d.

The air pump operates along with the start of the laser beam welding, so that the air pumped by the air pump is split into the air blow nozzles 72a to 72d via the air supply pipe and the air is jetted from the air blow nozzles 72a to 72d toward the internal space of the unit body 71.

As described above, the air jet directions of the air jetted from the air blow nozzles 72a to 72d are different from each other, and the air blow obtained by mixing the air jetted from the air blow nozzles 72a to 72d flows in a direction slightly inclined toward the Z1-direction side from the X1-direction in the internal space of the unit body 71. That is, as described above, the flow of the air has a flow component in a reverse direction from the dispersion direction of the spatters. On this account, even if the spatters enter the internal space of the unit body 71 from the opening 71e of the emission-side panel 71d, it is possible to restrain the spatters from reaching the cover-glass G. The spatters are returned to the workpiece-W side or flow toward the guide-fin-73 side along the air blow.

Further, after the air has crossed the optical path L of the laser beam, the air flows along the surface (the top surface 73c in FIG. 2) of the introduction plate 73a of the guide fin 73 on the Z2-direction side. That is, since the flow of the air is guided by the introduction plate 73a, it is possible to restrain the flow of the air from spreading.

The air that has passed through the edge (the edge on the X1-direction side) of the introduction plate 73a reaches the guide plate 73b. Since the guide plate 73b is configured to guide the flow of the air so as to change the flow of the air into a direction away from the laser irradiation position Wo on the workpiece W toward the downstream side in the flow direction of the air, it is possible to restrain the air from flowing into the laser irradiation position Wo on the workpiece W. Hereby, it is possible to restrain a machining environment at the laser irradiation position Wo from being disturbed and to restrain the occurrence of poor welding.

In the related art, as described above with reference to FIG. 9, the flow line of the air blow might hit the vertical portion w1 of the workpiece w, so that the flow-line direction might be reversed to cause the air to flow into the laser irradiation position e on the workpiece w. In this case, a machining environment at the laser irradiation position e is disturbed, so that poor welding might be caused. Particularly, in recent years, high output of a laser beam has been attempted for the purpose of shortening of machining time. In this case, in consideration that the generation amount of spatters tends to increase, the air flow of the air blow is increased. Because of this, the air is more likely to flow into the laser irradiation position e. Further, in a case where the welding operation is performed such that the laser scanner a is moved into the vehicle body (into a vehicle cabin) so as to achieve high efficiency of the welding operation of the vehicle body, the flow-line direction of the air blow is reversed due to the presence of various sheet metal panels around the laser irradiation position e, so that the air is more likely to flow into the laser irradiation position e. Furthermore, as described above, in a case where an air blow having a flow component in a reverse direction from the dispersion direction of the spatters is performed, the flow line of the air blow easily hits a structural object such as a part of the workpiece w or another workpiece. This causes the air to be more likely to flow into the laser irradiation position e.

In the present embodiment, as described above, the flow of the air is guided by the guide plate 73b so that the flow of the air is changed into the direction away from the laser irradiation position Wo on the workpiece W toward the downstream side in the flow direction of the air. Accordingly, it is possible to restrain the air from flowing into the laser irradiation position Wo on the workpiece W and to restrain the machining environment at the laser irradiation position Wo from being disturbed, thereby making it possible to restrain the occurrence of poor welding.

Further, the flow rate of the air guided by the guide plate 73b so as to be discharged from the air blow unit 7 is relatively high, so that air around the air thus discharged is entrapped. In the laser beam welding, fume is generated at the laser irradiation position Wo, and the fume is entrapped in the flow of the air discharged from the air blow unit 7. However, in the present embodiment, the fume entrapment restraining plate 74 is provided, and therefore, in the space where the air flows, a region where the fume is entrapped is a region on the X1-direction side from the distal position (the edge position on the X1-direction side) of the fume entrapment restraining plate 74. That is, the fume is entrapped in a region away from the optical path L of the laser beam (see an arrow H indicative of the entrapment of the fume in FIG. 7). This makes it possible to restrain such a situation that the fume flows into the optical path L of the laser beam or the fume is attached to the cover-glass G, so that sufficient energy of the laser beam to reach the laser irradiation position Wo on the workpiece W cannot be obtained.

Further, the laser welding device 1 according to the present embodiment can perform remote laser welding in which scanning with the laser beam is performed by use of the mirrors such that the application direction of the laser beam is changed without moving the laser scanner 3. On this account, when the scanning with the laser beam is performed by use of the mirrors from a state where the laser beam welding is performed as illustrated in FIG. 7, the workpiece W is irradiated with the laser beam such that an optical path of the laser beam as indicated by an alternate long and two short dashes line L1 in FIG. 7 is changed to an optical path of the laser beam as indicated by an alternate long and two short dashes line L2, for example. Hereby, the laser beam welding can be performed in such a state where the laser beam is applied to a laser irradiation position Wo' that is different from the laser irradiation position Wo in the laser beam welding described above. In this case, as the laser irradiation position Wo is changed to the laser irradiation position Wo', a generation part of spatters is also changed, so that the dispersion direction of spatters at the time when the spatters are dispersed toward the laser scanner body 6 is also changed. Even in this case, the spatters are restrained from reaching the cover-glass G by the air blow, similarly to the above case. Further, the flow of the air is guided by the guide plate 73b so that the flow of the air is changed into a direction away from the laser irradiation position Wo' on the workpiece W toward the downstream side in the flow direction of the air. Accordingly, it is possible to restrain the air from flowing into the laser irradiation position Wo' on the workpiece W and to restrain a machining environment at the laser irradiation position Wo' from being disturbed, thereby making it possible to restrain the occurrence of poor welding.

Effects of Embodiment

As described above, in the present embodiment, the guide plate 73b is provided and the guide plate 73b is configured to guide the flow of the air so that the flow direction of the air that has crossed the optical path L of the laser beam is changed into the direction away from the laser irradiation position Wo on the workpiece W toward the downstream side in the flow direction of the air. On this account, even in a case where a structural object such as a part of the workpiece W or another workpiece exists on the extension line of the flow direction of the air that has crossed the optical path L of the laser beam (on the extension line of the flow direction of the air on the assumption that the flow direction is not changed), the air is prevented from hitting the structural object, thereby restraining such a situation that the flow direction of the air is reversed by the structural object and the air flows into the laser irradiation position Wo on the workpiece W. As a result, it is possible to restrain the machining environment at the laser irradiation position Wo on the workpiece W from being disturbed and to restrain the occurrence of poor welding.

Further, the upstream edge of the guide plate 73b in the flow direction of the air serves as a starting point at which the flow direction of the air is changed (the flow line of the air hits the guide plate 73b). Along with this, in the upstream edge of the guide plate 73b in the flow direction of the air, the pressure increases, so that the flow rate of the air might decrease. However, the upstream edge of the guide plate 73b in the flow direction of the air is set at a position away from the optical path L of the laser beam due to the presence of the introduction plate 73a, so that the upstream edge of the guide plate 73b in the flow direction of the air rarely affects the flow rate of the air crossing the optical path L of the laser beam. That is, it is possible to maintain a high flow rate of the air crossing the optical path L of the laser beam, thereby making it possible to sufficiently obtain a spatter sweeping effect by the air.

Further, the flow of the air that has crossed the optical path L of the laser beam (the flow of the air before reaching the guide plate 73b) is guided by the introduction plate 73a. Accordingly, the introduction plate 73a restrains the flow of the air that has crossed the optical path L of the laser beam from spreading (spreading toward the laser irradiation position Wo on the workpiece W), and then, the guide plate 73b changes the flow direction of the air. Hereby, it is possible to restrain such a situation that the flow of the air spreads and the air partially flows into the laser irradiation position Wo on the workpiece W, so that the machining environment at the laser irradiation position Wo is disturbed.

Further, each of the air blow nozzles 72a to 72d is placed to face a direction where the air jetted from the air blow nozzles 72a to 72d and mixed is directed to the boundary part A between the introduction plate 73a and the guide plate 73b (the part as the downstream edge of the introduction plate 73a in the flow direction of the air and as the upstream edge of the guide plate 73b in the flow direction of the air). Accordingly, a large part of the air jetted from the air blow nozzles 72a to 72d can flow generally over the entire guide plate 73b in its lengthwise direction (the direction along the flow of the air), thereby making it possible to cause the flow direction of the air to be surely directed to the direction away from the laser irradiation position Wo on the workpiece W. This makes it possible to surely restrain the air from partially flowing into the laser irradiation position Wo on the workpiece W.

Further, since the fume entrapment restraining plate 74 is disposed, the region where the fume is entrapped, in the space where the air flows, is a region deviating from the fume entrapment restraining plate 74, that is, a region away from the optical path L of the laser beam. Hereby, the fume entrapment restraining plate 74 restrains the fume from flowing-in in the optical path L of the laser beam or the laser-beam emission side of the laser scanner body 6. As a result, it is possible to restrain such a situation that the fume flows into the optical path L of the laser beam or the fume is attached to the cover-glass U attached near the emission opening of the laser scanner body 6, so that sufficient energy of the laser beam to reach the laser irradiation position Wo on the workpiece W cannot be obtained.

Further, the fume entrapment restraining plate 74 is configured such that its surface on the side facing the laser irradiation position Wo on the workpiece W is formed in a recessed curved surface (the inner surface 74a formed in a curved surface). Accordingly, at the time when the spatters hit the fume entrapment restraining plate 74, the spatters are restrained from rebounding toward the laser scanner body 6. That is, the fume entrapment restraining plate 74 restrains the spatters from rebounding toward the laser scanner body 6 and being attached to the cover-glass G. Hereby while a function of the fume entrapment restraining plate 74 is maintained, it is possible to restrain the spatters from being attached to the cover-glass C due to the presence of the fume entrapment restraining plate 74.

Figure 8:
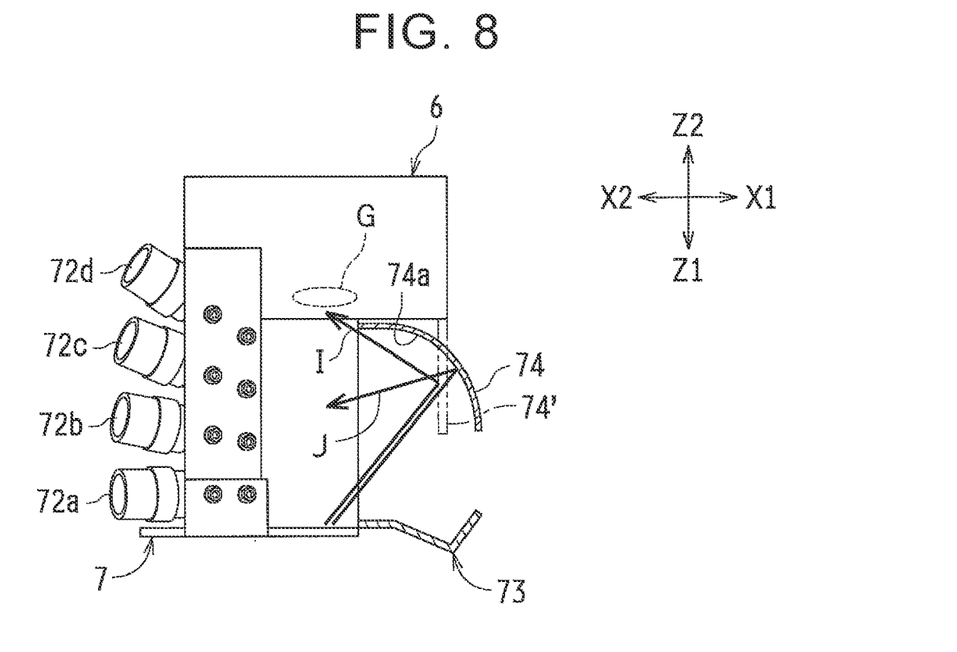
FIG. 8 is a view to describe a rebounding direction of spatters by a fume entrapment restraining plate in the laser welding device according to the embodiment.

More specifically, in a case where a fume entrapment restraining plate 74' is constituted by a flat plate (a flat plate extending in the vertical direction in FIG. 8) as indicated by a virtual line in FIG. 8, the spatters are more likely to rebound toward the laser scanner body 6 due to the fume entrapment restraining plate 74' as indicated by an arrow 1 in the figure, so that the spatters might be attached to the cover-glass G. On the other hand, in the present embodiment, the inner surface 74a of the fume entrapment restraining plate 74 is formed in a recessed curved surface, and therefore, the fume entrapment restraining plate 74 can restrain the spatters from rebounding toward the laser scanner body 6, as indicated by an arrow J in the figure, thereby making it possible to restrain the spatters from being attached to the cover-glass G.

Other Embodiments

Note that the present disclosure is not limited to the embodiment. The present disclosure can include all modifications and applications made within Claims and a range equivalent to Claims.

For example, the embodiment deals with a case where the present disclosure is applied to the laser welding device 1 used in the manufacturing process of the vehicle body for the automobile. However, the present disclosure can be also applied to a laser welding device for performing laser beam welding on other members.

Further, in the embodiment, the guide fin 73 configured to guide the flow direction of the air is constituted by the introduction plate 73a and the guide plate 73b. The present disclosure is not limited to this, and the guide fin 73 may be constituted only by the guide plate 73b. However, in this case, it is desired for the position where the flow direction of the air is changed by the guide plate 73b not to be so close to the optical path L of the laser beam. On this account, it is preferable that the length of the unit body 71 in the X-direction be set to be long, for example, so that the edge position of the unit body 71 on the X1-direction side is disposed closer to the X1-direction side than in the embodiment so as to provide a predetermined interval between the edge position (the edge position on the X2-direction side) of the guide plate 73b and the optical path L of the laser beam.

Further, in the embodiment, the air blow unit 7 is provided with the cover plates 75a, 75b disposed over the guide fin 73 and the fume entrapment restraining plate 74. In the present disclosure, the cover plates 75a, 75b are not necessarily required, and the air blow unit 7 may be configured without the cover plates 75a, 75b.

Further, in the embodiment, the gas flowing in the direction crossing the optical path L of the laser beam in the air blow unit 7 is the air. The present disclosure is not limited to this, and other gases may be used.

The present disclosure is applicable to a laser welding device configured to feed a gas in a direction crossing an optical path of a laser beam so as to restrain spatters from being attached to a cover-glass.

What is claimed is:

1. A laser welding device comprising:
   a laser scanner body configured to emit a laser beam to a workpiece;
   a jet nozzle configured to jet a gas from a first side to a second side so as to cause the gas to cross an optical path of the laser beam emitted from the laser scanner body; and
   a guide plate disposed on a downstream side in a flow direction of the gas, from the optical path of the laser beam, the guide plate being extended in a direction away from a laser irradiation position on the workpiece toward the second side such that the flow direction of the gas that has crossed the optical path of the laser beam is changed into the direction away from the laser irradiation position on the workpiece toward the downstream side in the flow direction of the gas,
   wherein a first end of the guide plate on an upstream side in the flow direction of the gas is continuously provided with an introduction plate disposed on the downstream side in the flow direction of the gas, from the optical path of the laser beam, the introduction plate being extended in a direction along the flow direction of the gas that has crossed the optical path of the laser beam.

2. The laser welding device according to claim 1, wherein:
   the jet nozzle includes a plurality of jet nozzles; and
   the jet nozzles are placed to face a direction where gases jetted from the jet nozzles and mixed with each other flow toward a boundary part between the introduction plate and the guide plate.

3. A laser welding device comprising:
   a laser scanner body configured to emit a laser beam to a workpiece;
   a jet nozzle configured to jet a gas from a first side to a second side so as to cause the gas to cross an optical path of the laser beam emitted from the laser scanner body;
   a guide plate disposed on a downstream side in a flow direction of the gas, from the optical path of the laser beam, the guide plate being extended in a direction away from a laser irradiation position on the workpiece toward the second side such that the flow direction of the gas that has crossed the optical path of the laser beam is changed into the direction away from the laser irradiation position on the workpiece toward the downstream side in the flow direction of the gas; and
   a fume entrapment restraining plate disposed at a position where the fume entrapment restraining plate faces the guide plate via a predetermined interval with a circulation space being sandwiched between the fume entrapment restraining plate and the guide plate, the circulation space being a space through which the gas that has crossed the optical path of the laser beam flows, the fume entrapment restraining plate being configured to restrain fume from flowing-in toward the optical path of the laser beam.

4. The laser welding device according to claim 3, wherein the fume entrapment restraining plate is configured such that a surface on a side facing the laser irradiation position on the workpiece is formed in a recessed curved surface.

5. The laser welding device according to claim 1, wherein the jet nozzle is included in an air blow unit attached to a laser emission surface of the laser scanner body.

6. The laser welding device according to claim 1, wherein:
   the jet nozzle includes a plurality of jet nozzles;
   the jet nozzles include a first jet nozzle and a second jet nozzle;
   the first jet nozzle and the second jet nozzle are placed in order of the second jet nozzle and the first jet nozzle along a direction where the laser beam is emitted; and
   the second jet nozzle is placed such that a second flow-line direction of a gas jetted from the second jet nozzle is inclined with a predetermined inclination toward the laser irradiation position from a reference line connecting a position where the second jet nozzle is placed to the optical path of the laser beam in a perpendicular manner to the optical path of the laser beam, and the predetermined inclination of the second flow-line direction is larger than an inclination of a first flow-line direction of a gas jetted from the first jet nozzle, the first flow-line direction being inclined with the inclination toward the laser irradiation position from a reference line connecting a position where the first jet nozzle is placed to the optical path of the laser beam in a perpendicular manner to the optical path of the laser beam.

* * * * *